(12) United States Patent
Wang et al.

(10) Patent No.: US 10,274,362 B2
(45) Date of Patent: Apr. 30, 2019

(54) MEASURING DEVICE FOR MEASURING LARGE MASS WITH OPTICAL REFRACTION AND DISPLACEMENT MEASURING

(71) Applicant: National Institute of Metrology, Beijing (CN)

(72) Inventors: Jian Wang, Beijing (CN); Changqing Cai, Beijing (CN); Xiaoping Ren, Beijing (CN); Tao Li, Beijing (CN); Manhong Hu, Beijing (CN); Xiaolei Wang, Beijing (CN); Honglei Ji, Beijing (CN); Xiang Wang, Beijing (CN); Ping Chen, Beijing (CN)

(73) Assignee: NATIONAL INSTITUTE OF METROLOGY, Beijing (CN)

( * ) Notice: Subject to any disclaimer, the term of this patent is extended or adjusted under 35 U.S.C. 154(b) by 197 days.

(21) Appl. No.: 15/534,045

(22) PCT Filed: Oct. 12, 2016

(86) PCT No.: PCT/CN2016/099218
§ 371 (c)(1),
(2) Date: Jun. 8, 2017

(87) PCT Pub. No.: WO2018/040136
PCT Pub. Date: Mar. 8, 2018

(65) Prior Publication Data
US 2018/0335337 A1    Nov. 22, 2018

(30) Foreign Application Priority Data
Aug. 29, 2016    (CN) .......................... 2016 1 0753783

(51) Int. Cl.
*G01G 1/22*      (2006.01)
*G01G 1/26*      (2006.01)
(Continued)

(52) U.S. Cl.
CPC ............... *G01G 23/32* (2013.01); *G01G 1/22* (2013.01); *G01G 1/26* (2013.01); *G01G 21/00* (2013.01); *G01G 23/01* (2013.01)

(58) Field of Classification Search
CPC ............ G01G 23/32; G01G 1/22; G01G 1/26; G01G 21/00; G01G 23/01
(Continued)

(56) References Cited

U.S. PATENT DOCUMENTS 3,891,040 A * 6/1975 Schmitter .............. G01G 1/246
                                                    177/173
4,245,711 A * 1/1981 Kunz ..................... G01G 7/045
                                                  177/210 EM
(Continued)

FOREIGN PATENT DOCUMENTS

CN     101893470 A    11/2010
CN     104677479 A    6/2015
(Continued)

OTHER PUBLICATIONS

International Search Report for PCT/CN2016/099218 dated Feb. 3, 2017.
Written Opinion for PCT/CN2016/099218 dated Feb. 3, 2017.

*Primary Examiner* — Natalie Huls
*Assistant Examiner* — Monica S Young
(74) *Attorney, Agent, or Firm* — Meagher Emanuel Laks Goldberg & Liao, LLP (57) ABSTRACT

The invention discloses a measuring device for measuring the mass of a weight, comprising: a main frame; a main beam supported on main frame; a balancing system loaded on one end of the main beam; a weighting system, loaded on the other end of the main beam; a weight transportation system capable of transporting and loading a standard weight or a test weight into the weighting system and capable of unloading and transporting them away from the weighting system; and a control system comprising an
(Continued)

optical sensor mounted in the main frame, a laser displacement sensor mounted on the main beam, a monitor, and a control unit connected electrically to the optical sensor, the laser displacement sensor and the monitor. The control system is adapted to compare a main beam first displacement data obtained by the optical sensor and a main beam second displacement data obtained by the laser displacement sensor to accurately measure the actual displacement of the main beam.

10 Claims, 10 Drawing Sheets

(51) Int. Cl.
  *G01G 21/00* (2006.01)
  *G01G 23/01* (2006.01)
  *G01G 23/32* (2006.01)
  *G01G 23/22* (2006.01)
(58) Field of Classification Search
  USPC .......................................................... 177/178
  See application file for complete search history.

(56) References Cited

U.S. PATENT DOCUMENTS

| | | | | |
|---|---|---|---|---|
| 4,433,740 A | * | 2/1984 | Luchinger | G01G 21/23 177/187 |
| 4,489,800 A | * | 12/1984 | Nufer | G01G 7/04 177/210 EM |
| 4,533,008 A | * | 8/1985 | Ostermann | G01G 21/18 177/132 |
| 4,627,505 A | * | 12/1986 | Kunz | G01G 7/02 177/1 |
| 5,092,416 A | * | 3/1992 | Luechinger | G01G 21/08 177/229 |
| 5,141,066 A | * | 8/1992 | Strickler | G01G 21/28 177/210 EM |
| 5,191,948 A | * | 3/1993 | Strickler | G01G 21/20 177/184 |
| 5,252,920 A | * | 10/1993 | Date | G01R 33/16 324/201 |
| 5,543,723 A | * | 8/1996 | Shinagawa | G01R 31/311 324/750.19 |
| 2008/0053249 A1 | * | 3/2008 | Reber | G01G 7/04 73/862.69 |
| 2014/0332290 A1 | * | 11/2014 | Izumo | G01G 7/02 177/1 |

FOREIGN PATENT DOCUMENTS

| | | | | |
|---|---|---|---|---|
| CN | 204439202 U | | 7/2015 | |
| CN | 105091768 A | | 11/2015 | |
| DE | 102013205456 A1 | | 10/2014 | |
| GB | 2133572 A | * | 7/1984 | ............... G01D 5/28 |

* cited by examiner

MEASURING DEVICE FOR MEASURING LARGE MASS WITH OPTICAL REFRACTION AND DISPLACEMENT MEASURING

TECHNICAL FIELD

The invention relates to a measuring device for measuring the mass of a weight.

BACKGROUND ART

In prior art, the manufacturing process of a central knife, a side knife and respective knife bearings of a mechanical balance for measuring large mass is simple, which can not achieve the hardness and toughness necessary for measuring a heavy weight. Moreover, in prior art, the load synchronization and the consistency between a main beam swing and an indication system of the mechanical balance are both poor, which makes the amount of the horizontal movements of a central knife system and a side knife system can not be reduced during a loading process, therefore the mechanical balance for measuring large mass can not acquire a high accuracy measurement in the progress of measuring the heavy weight.

According to the above reasons, in prior art, a measurement of a 500 kg weight with a repeatability of 0.05 g, a measurement of a 1000 kg weight with a repeatability of 0.5 g, and a measurement of a 2000 kg weight with a repeatability of 1 g can not be achieved.

SUMMARY OF THE INVENTION

An object of the invention is to provide a solution to the problems in prior art that a mass comparator or a mechanical balance can not acquire a high accuracy measurement.

For this end, the invention in one aspect provides a measuring device for measuring the mass of a weight, comprising: a main frame, a main beam supported on the main frame, a balancing system loaded on one end of the main beam, a weighting system loaded on the other end of the main beam, a weight transportation system capable of transporting and loading a standard weight or a test weight into the weighting system and capable of unloading and transporting them away from the weighting system, and a control system comprising an optical sensor mounted in the main frame, a laser displacement sensor mounted on the main beam, a monitor, and a control unit connected electrically to the optical sensor, the laser displacement sensor and the monitor. The control system is adapted to compare a main beam first displacement data obtained by the optical sensor and a main beam second displacement data obtained by the laser displacement sensor to accurately measure the actual displacement of the main beam. This has advantages that the reading error caused by manually reading can be avoided, increasing the accuracy of weight measurement reading.

According to a possible embodiment of the invention, the main beam further comprises a link extending perpendicular to the direction of the main beam, one end of the link is fixed to the bottom of the main beam and the other end thereof extends into the main frame and attached to a gauge, the link is fixed to the bottom of the main beam, so that the link can swing together with the main beam.

According to a possible embodiment of the invention, the gauge comprises a scale area, which scale area comprises multiple scales arranged symmetrically relative to an axis of the gauge.

According to a possible embodiment of the invention, the optical sensor is arranged in such a way in the main frame that its lens is pointed right at the gauge to allow the optical sensor to read the scale movement caused by the swinging of the main beam to obtain the main beam first displacement data, and to transfer the main beam first displacement data to the monitor for real-time displaying.

According to a possible embodiment of the invention, the laser displacement sensor is adapted to emit laser, the main beam comprises two reflection panels arranged equidistantly relative to the axis of the main beam for reflecting laser, the laser displacement sensor is arranged on the main frame and below the corresponding reflection panel for reading the laser beam length change caused by the swinging of the main beam, and transferring a signal representing the laser beam length change to the control unit to obtain the main beam second displacement data.

According to a possible embodiment of the invention, the distance between the center of the reflection panel and the axis of the main beam is 10% to 20% of the length of the main beam, the distance between the laser displacement sensor and the reflection panel is 6 to 10 cm.

According to a possible embodiment of the invention, the length of the main beam is about 2 m, the distance between the center of the reflection panel and the axis of the main beam is about 0.3 m, the distance between the laser displacement sensor and the reflection panel is about 10 cm.

According to a possible embodiment of the invention, the scale area has a length from 4 to 8 cm, and the scales have a quantity from 160 to 200.

According to a possible embodiment of the invention, the scale area has a length of about 4 cm, the scales has a quantity of about 160, and the distance between each adjacent scale is about 0.25 mm.

According to a possible embodiment of the invention, the test weight has a cubic or cylindrical shape. The weighting system further comprises a detachable weight stand. The weight transportation system further comprises a detachable weight support and a detachable weight tray. In the condition that the test weight has a cubic shape, the weight stand and the weight support are removed, and the weight tray is mounted into the weight transportation system, so that the test weight can be loaded into the weighting system by means of the weight tray. In the condition that the test weight has a cylindrical shape, the weight tray is removed, and the weight stand and the weight support are mounted into the weighting system and the weight transportation system respectively, so that the test weight can be loaded into the weighting system by means of the weight stand and the weight support. This has advantages that the weighting system is compatible of different shapes of the test weight, which expands the available application of the measuring device.

BRIEF DESCRIPTION OF THE DRAWINGS

The foregoing and other aspects of the invention will be understood and appreciated more fully from the following detailed description taken in conjunction with the drawings, in which.

DETAILED DESCRIPTION OF PREFERRED EMBODIMENTS

Figure 1:
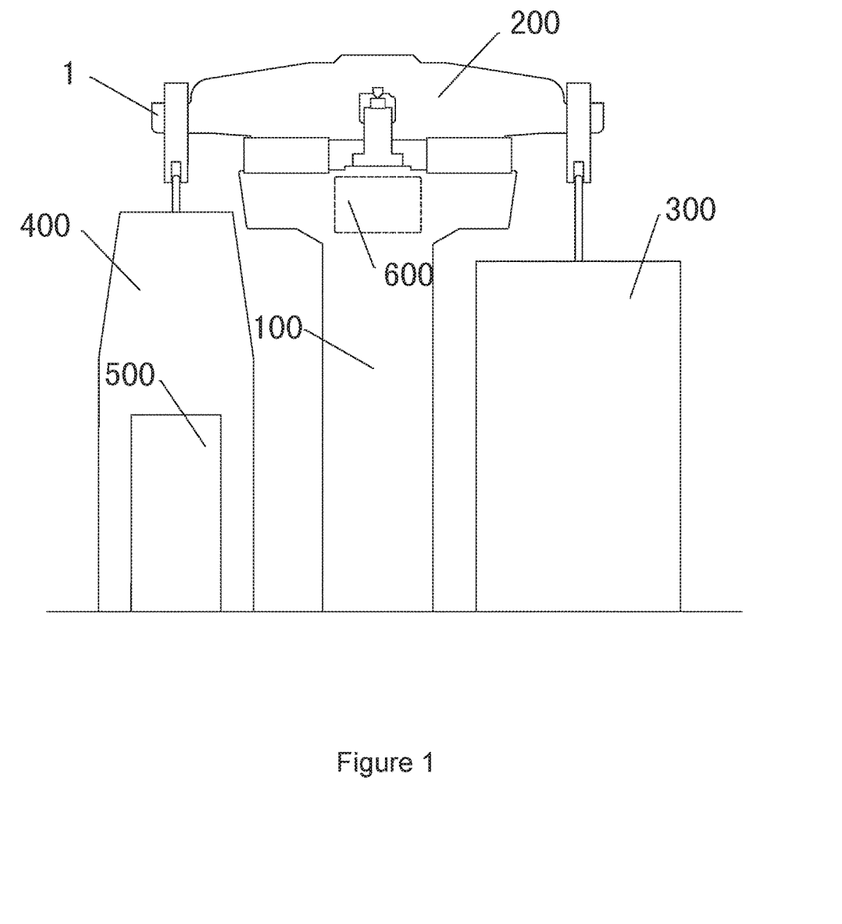
FIG. 1 is a schematic diagram of a measuring device according to a possible embodiment of the invention.

FIG. 1 is a schematic diagram of a measuring device 1 according to a possible embodiment of the invention. As shown in the figure, measuring device 1 comprises a main frame 100, a main beam 200, a balancing system 300, a weighting system 400, a weight transportation system 500 and a control system 600. The main frame 100 is connected to the balancing system 300 and the weighting system 400 via the main beam 200.

Figure 2:
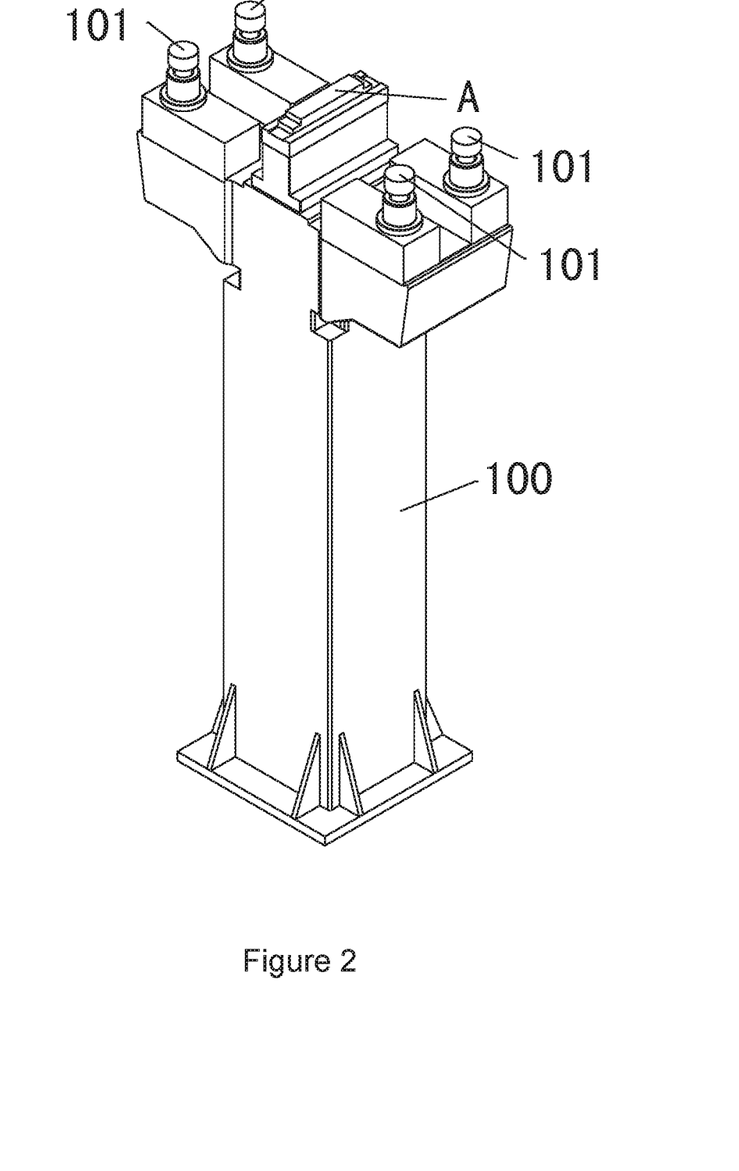
FIG. 2 is a perspective view of a main frame of the measuring device in FIG. 1.

FIG. 2 is a perspective view of the main frame 100 of the measuring device 1 in FIG. 1. As shown in the figure, the main frame 100 comprises a main beam motor 101. The main frame 100 is adapted to lift the main beam 200 up or down by the main beam motor 101. In the condition that the main beam 200 is placed on the main frame 100, the main beam 200 is configured to swing slightly about an axis A of the main beam 200.

Figure 3:
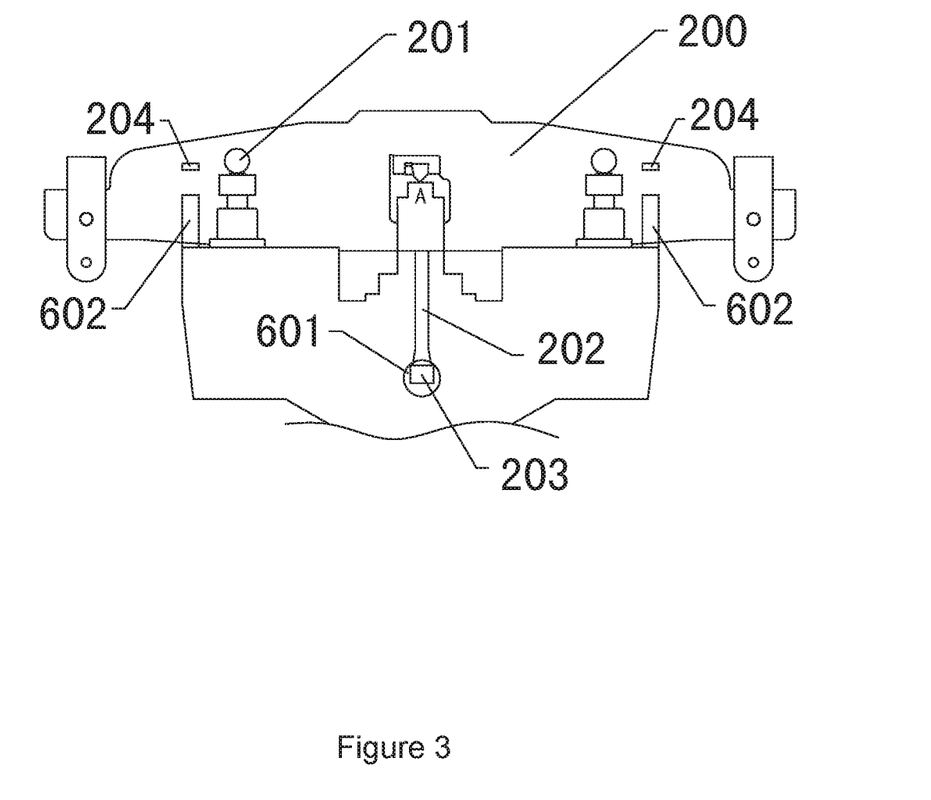
FIG. 3 is a schematic diagram of the main beam of the measuring device in FIG. 1.

FIG. 3 is a schematic diagram of the main beam 200 of the measuring device 1 in FIG. 1. As shown in the figure, the main beam 200 comprises a supporting rod 201 extending outward from the main beam 200 perpendicular to the main beam 200. The supporting rod 201 is placed on the main beam motor 101, so that the main beam 200 is supported on the main frame 100 by means of the main beam motor 101.

The main beam 200 further comprises a link 202 extending perpendicular to the main beam 200, one end of which link 202 is fixed to the bottom of the main beam 200 and the other end thereof extends into the main frame 100 and is attached by a gauge 203. The link 202 is configured to swing together with the main beam 200 about the axis A of the main beam 200, since one end of the link 202 is fixed to the bottom of the main beam 200.

Two reflection panels 204 are arranged equidistantly relative to the axis A of the main beam 200. The reflection panel 204 is made by grinding and polishing from 304-series stainless steel, for reflecting laser.

Figure 4:
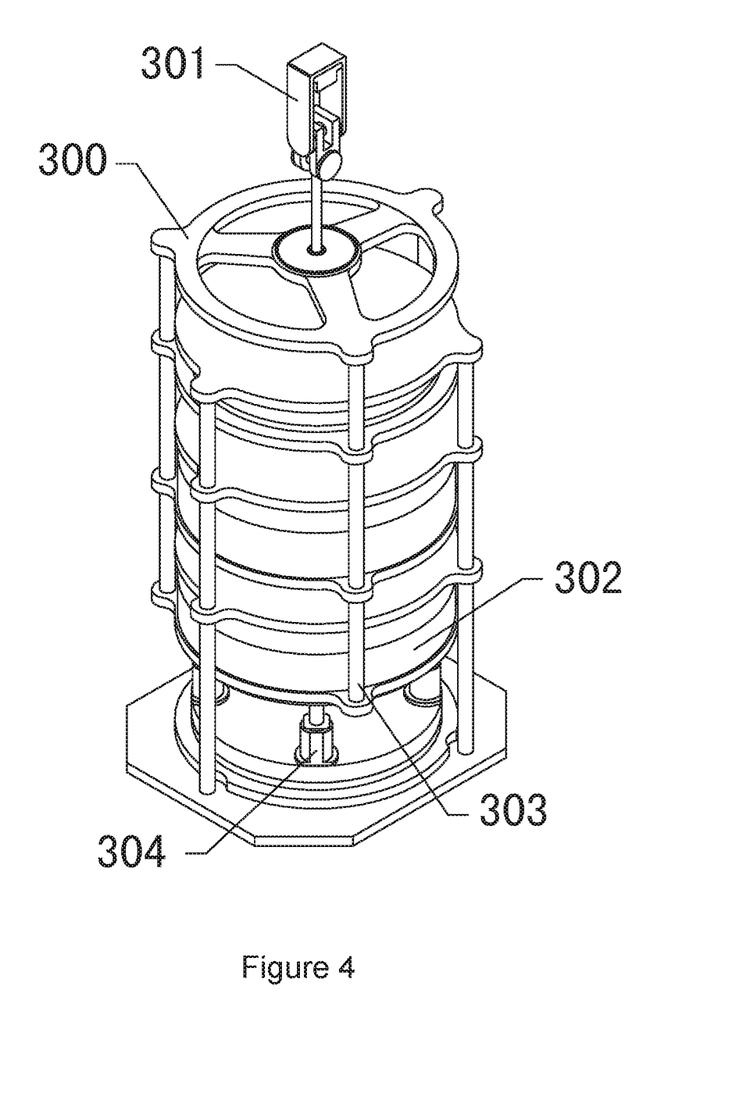
FIG. 4 is a perspective view of a balancing system of the measuring device in FIG. 1.

FIG. 4 is a perspective view of the balancing system 300 of the measuring device 1 in FIG. 1. As shown in the figure, the balancing system 300 comprises a balancing system connector 301, a set of counterweights 302, a counterweight carrier 303 and a balancing motor 304. The balancing system 300 is loaded onto the main beam 200 by means of the balancing system connector 301. The counterweight carrier 303 is provided with a set of counterweights 302. The counterweight carrier 303 is supported on the balancing motor 304. The balancing motor 304 is configured to push the counterweight carrier 303 up and down to achieve the loading and unloading of the balancing system 300.

Figure 5:
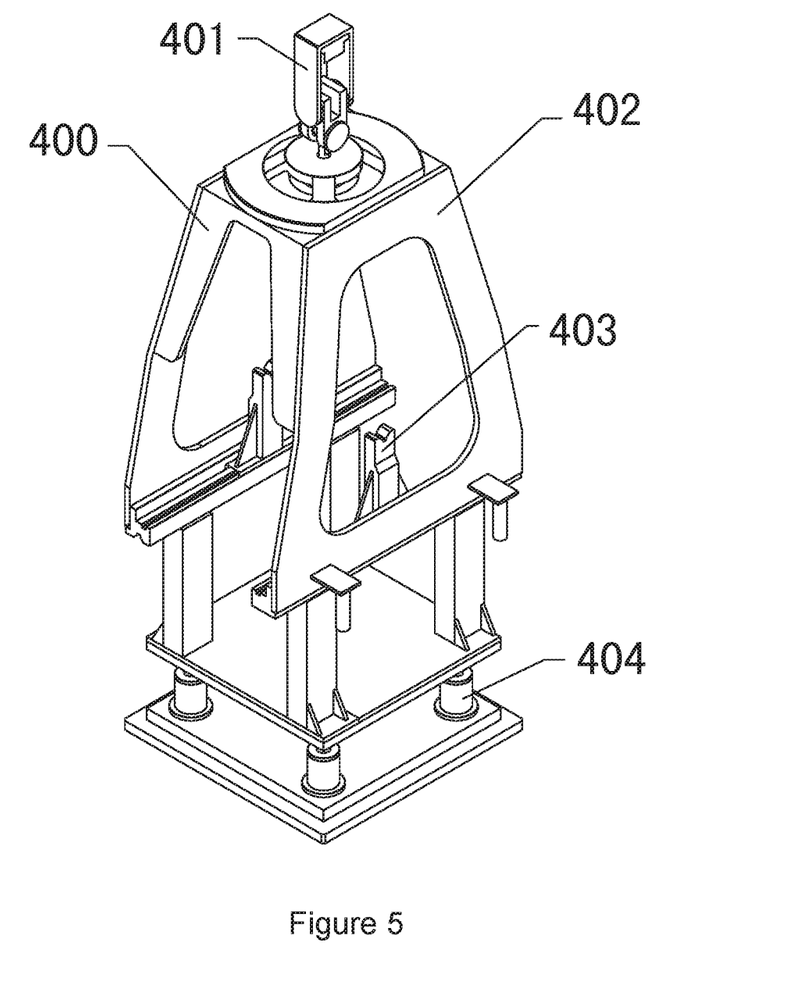
FIG. 5 is a perspective view of a weighting system of the measuring device in FIG. 1.

FIG. 5 is a perspective view of the weighting system 400 of the measuring device in FIG. 1. As shown in the figure, the weighting system 400 comprises a weighting system connector 401, a weighting carrier 402, a weight stand 403 and a weighting motor 404. The weighting system 400 is loaded onto the main beam 200 by means of the weighting system connector 401. The weighting carrier 402 is supported on the weighting motor 404. The weighting motor 404 is configured to push the weighting carrier 402 up and down to achieve the loading and unloading of the weighting system 400. The weight stand 403 has a recess on its top and is configured to be mounted in the weighting system 400 or removed from the weighting system 400 as required to adapt different shapes of a test weight 504.

Figure 6:
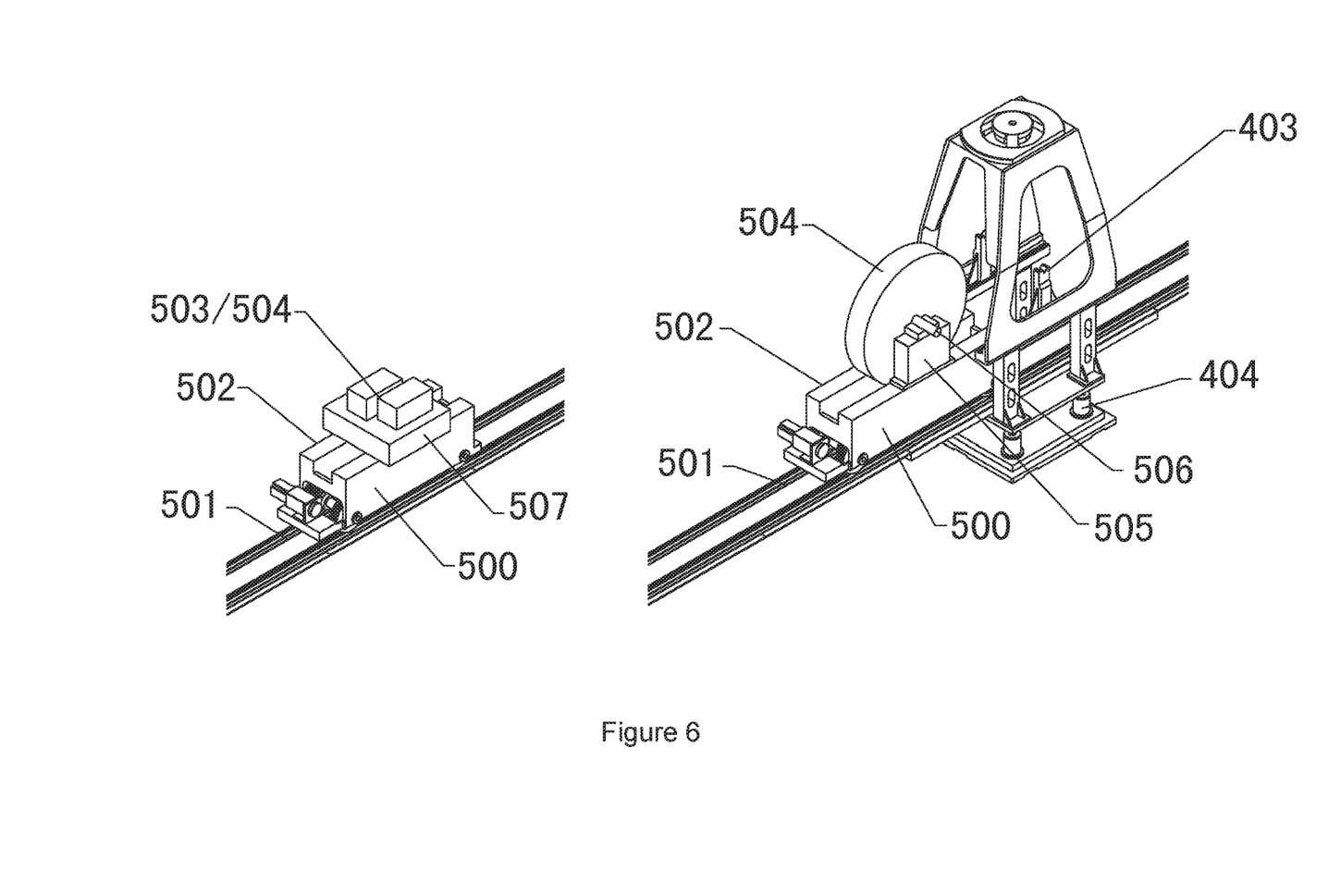
FIG. 6 is a perspective view of a weight transportation system of the measuring device in FIG. 1, showing the relative positions of the weight transportation system and the weighting system.

FIG. 6 is a perspective view of the weight transportation system 500 of the measuring device 1 in FIG. 1, showing the relative positions of the weight transportation system 500 and the weighting system 400. As shown in the figure, the weight transportation system 500 comprises a transportation guide 501, a transportation vehicle 502, a standard weight 503 and the test weight 504. The transportation guide 501 extends below the weighting carrier 402. The transportation vehicle 502 is adapted to slide on the transportation guide 501, so that the transportation vehicle 502 can access the weighting carrier 402 to transport and load the standard weight 503 or the test weight 504 into the weighting system 400 and unloading and transporting them away from the weighting system 400. The transportation vehicle 502 has an intermediary groove extending along the direction of sliding. In the condition that the test weight 504 has a cylindrical shape, the intermediary groove is adapted to accommodate a portion of the test weight 504. The intermediary groove is provided with a detachable weight support 505 on both sides with a recess on its top.

The test weight 504 has a cubic or cylindrical shape. In the condition that the test weight 504 has a cylindrical shape, a support rod 506 extending outward is provided on centers of two end surfaces of the cylinder. The support rod 506 is placed in the recess of the corresponding weight support 505 for transporting to prevent the test weight 504 from shaking and falling when the transportation vehicle 502 slides.

Figure 7:
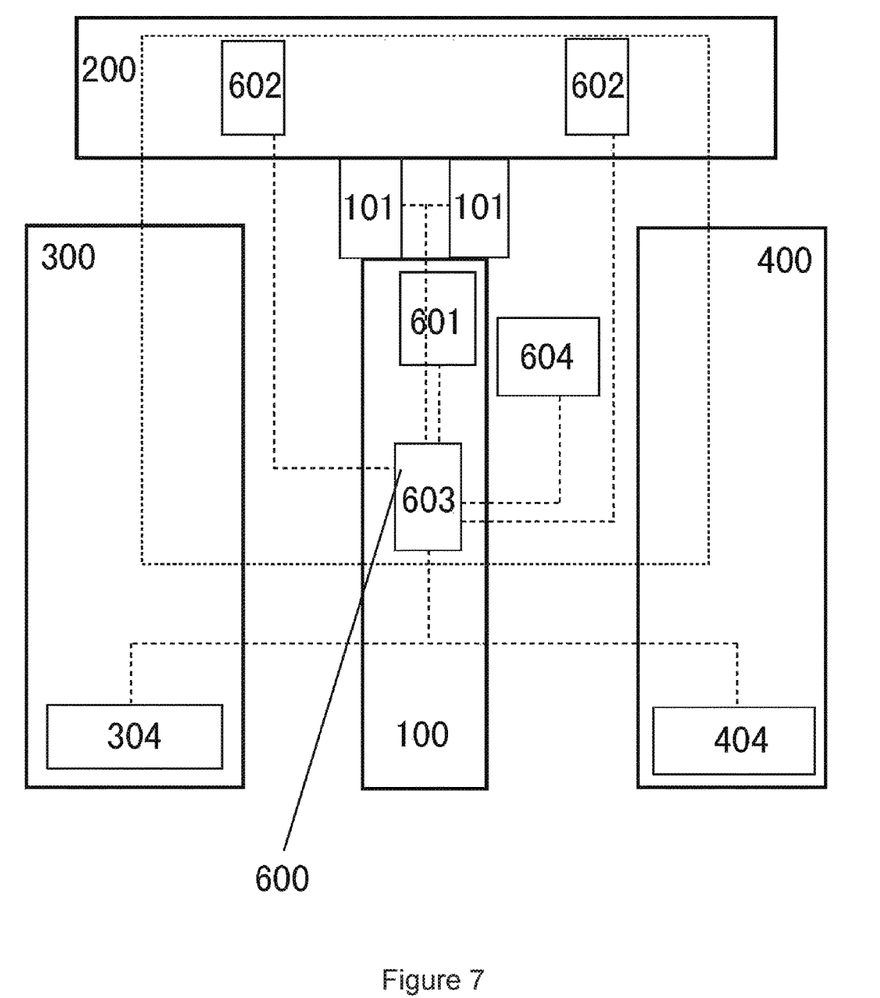
FIG. 7 is a schematic diagram of a control system of the measuring device in FIG. 1.

FIG. 7 is a schematic diagram of the control system 600 of the measuring device 1 in FIG. 1. As shown in the figure, the control system 600 comprises an optical sensor 601, a laser displacement sensor 602, a control unit 603 and a monitor 604. The optical sensor 601 is arranged inside the main frame 100 and adapted to measure the displacement of the main frame 100 by way of image processing (e.g. optical refraction). As shown in FIG. 3, the laser displacement sensors 602 are arranged on both sides of the main beam 200 equidistantly relative to the axis A of the main beam 200 and adapted to measure the displacement of the main frame 100 by way of laser displacement positioning.

The control unit 603 is connected electrically to the optical sensor 601, the laser displacement sensor 603, the main beam motor 101, the balancing motor 304 and the weighting motor 404. The monitor 604 is connected to the control unit 603 for displaying the output of the optical sensor 601 and the laser displacement sensor 602 and other parameters of the measuring device 1. The control unit 603 is adapted to control the main beam motor 101, the balancing motor 304, the weighting motor 404 and the transportation vehicle 502.

The loading process of the standard weight 503 and the test weight 504 into the weighting system 400 is described referring to FIG. 6 and FIG. 7.

In the loading process of the standard weight 503, the weight stand 403 and the weight support 505 are removed, and the weight tray 507 is mounted onto the transportation vehicle 502. Initially, one or more standard weights 503 are placed in a detachable weight tray 507 on top of the transportation vehicle 502. Subsequently, the control unit 603 controls the transportation vehicle 502 to enter the weighting carrier 402. Subsequently, the control unit 603 controls the weighting motor 404 to lift the weighting carrier 402 up, so that the weight tray 507 falls from the transportation vehicle 502 onto the weighting carrier 402. Subsequently, the control unit 603 controls the transportation vehicle 502 to exit the weighting carrier 402. Finally, the control unit 603 controls the weighting motor 404 to return the weighting carrier 402 to its original position for following operations.

In the condition that the test weight 504 has a cylindrical shape, the weight tray 507 is removed, and the weight stand 403 and the weight support 505 are mounted onto the weighting carrier 402 and the transportation vehicle 502 respectively during the loading process of the test weight 504. Initially, the test weight 504 is placed on the weight support 505 on top of the transportation vehicle 502, so that the support rod 506 of the test weight 504 is placed in the corresponding recess of the weight support 505. The control unit 603 controls the transportation vehicle 502 to enter the weighting carrier 402, in particular moving the support rod 506 over the weight stand 403 and aligning it to the recess of the weight stand 403. Subsequently, the control unit 603 operates the weighting motor 404 to lift the weighting carrier 402 up, so that the test weight 504 falls from the weight support 505 of the transportation vehicle 502 onto the weight stand 403 of the weighting carrier 402. Subsequently, the control unit 603 controls the transportation vehicle 502 to exit the weighting carrier 402. Finally, the control unit 603 operates the weighting motor 404 to return the weighting carrier 402 to its original position for following operations.

In the condition that the test weight 504 has a cubic shape, the weight stand 403 and the weight support 505 are removed, and the weight tray 507 is mounted onto the transportation vehicle 502 during the loading process of the test weight 504. Initially, one or more test weights 504 are placed on the weight tray 507 on top of the transportation vehicle 502. Subsequently, the control unit 603 controls the transportation vehicle 502 to enter the weighting carrier 402. Subsequently, the control unit 603 controls the weighting motor 404 to lift the weighting carrier 402 up, so that the weight tray 507 falls from the transportation vehicle 502 onto the weighting carrier 402. Subsequently, the control unit 603 controls the transportation vehicle 502 to exit the weighting carrier 402. Finally, the control unit 603 controls the weighting motor 404 to return the weighting carrier 402 to its original position for following operations.

The unloading process of the standard weight 503 and the test weight 504 is reversed with regard to the loading process.

Figure 8A:
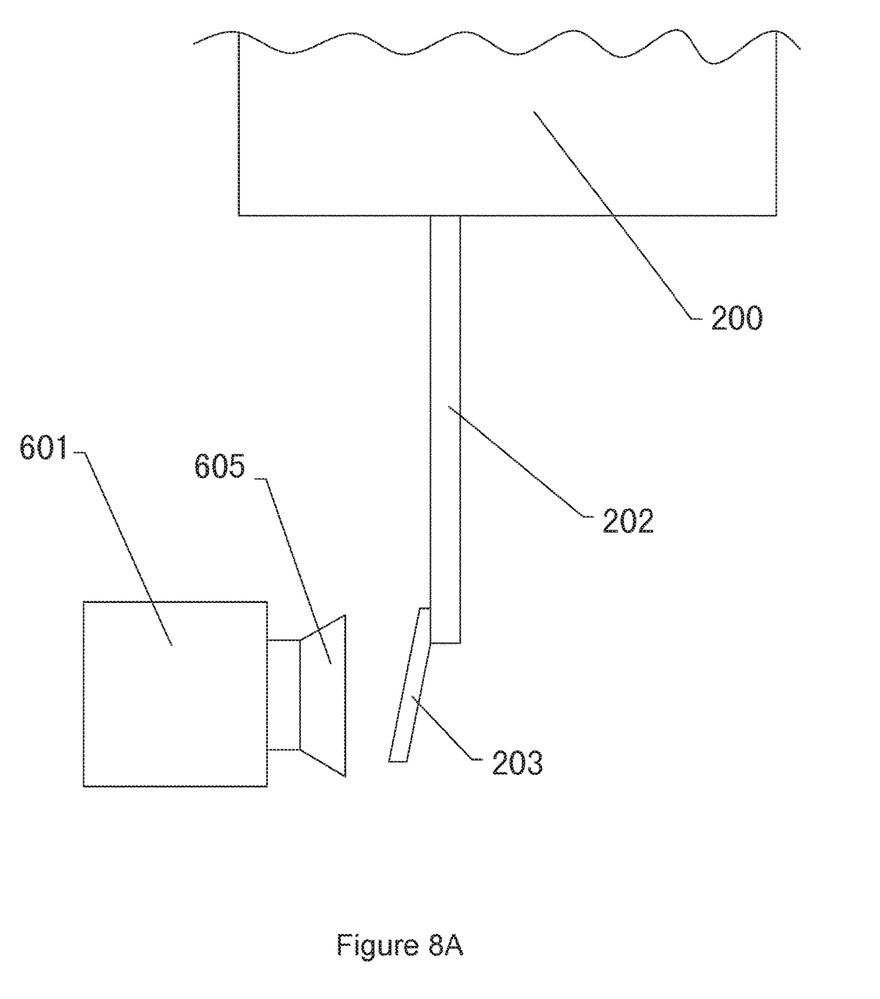
FIG. 8A is a side elevation view of an optical sensor of the control system in FIG. 7
Figure 8B:
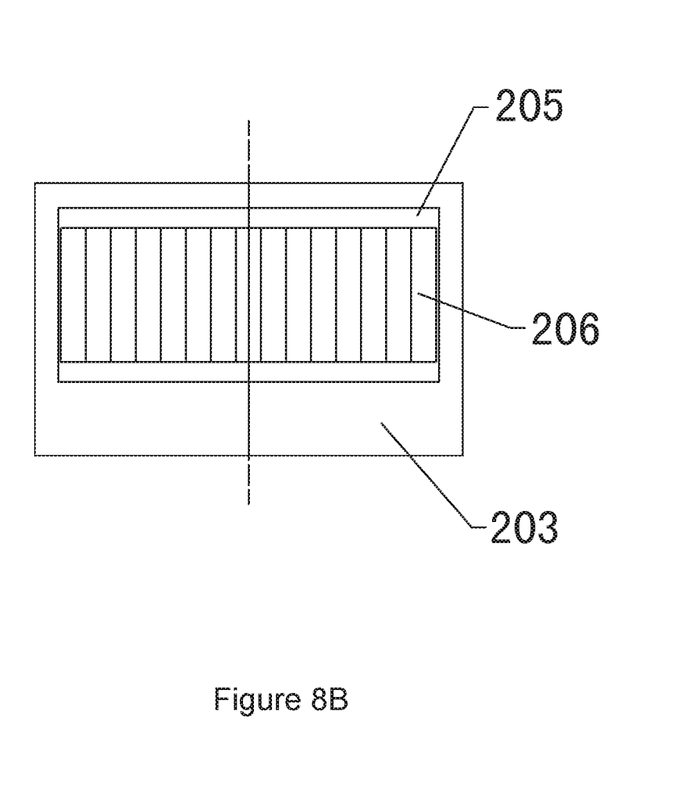
FIG. 8B is an enlarged view of a gauge.

FIG. 8A is a side elevation view of the optical sensor 601 of the control system 600 in FIG. 7 and FIG. 8B is an enlarged view of the gauge 203. As shown in the figure, the gauge 203 comprises a scale area 205 with a length from 4 to 8 cm. The scale area 205 comprises multiple scales 206 arranged symmetrically relative to an axis of the gauge 203 with a quantity from 160 to 200. For the sake of clarity, a portion of the scales 206 is omitted in the figure.

In a possible embodiment, the scale area 205 has a length of about 4 cm. The scales 206 have a quantity of about 160, and the distance between each adjacent scale 206 is about 0.25 mm.

The optical sensor 601 is arranged in such a way in the main frame 100 that its lens 605 is pointed right at the gauge 203 to read a scale movement caused by swinging of the main beam 200 to obtain a main beam first displacement data, and to transfer the main beam first displacement data to the control unit 603 and the monitor 604 for real-time displaying.

Figure 9:
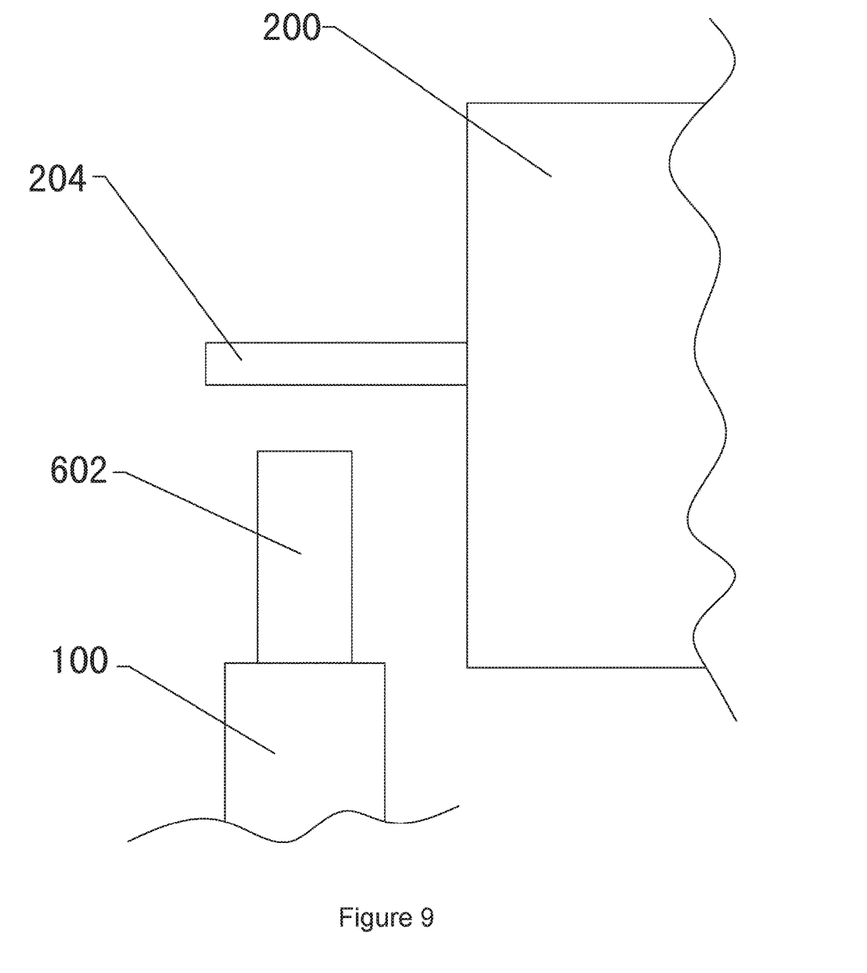
FIG. 9 is a side elevation view of a laser displacement sensor of the control system in FIG. 7.

FIG. 9 is a side elevation view of the laser displacement sensor 602 of the control system 600 in FIG. 7. As shown in the figure, the laser displacement sensor 602 is adapted to emit laser. The laser displacement sensor 602 is arranged in such a way on the main frame 100 that one laser displacement sensor 602 is placed under each corresponding reflection panel 204 to read a laser beam length change caused by swinging of the main beam 200 to obtain a main beam second displacement data, and to transfer the main beam second displacement data to the control unit 603 and the monitor 604 for real-time displaying.

The distance between the center of the reflection panel 204 and the center of the main beam 200 is from 10% to 20% of the length of the main beam 200. The distance between the laser displacement sensor 602 and the reflection panel 204 is from 6 to 10 cm.

In a possible embodiment, the main beam 200 has a length of about 2 m. The distance between the center of the reflection panel 204 and the center of the main beam 200 is about 0.3 m. The distance between the laser displacement sensor 602 and the reflection panel 204 is about 10 cm.

The control unit 603 is adapted to compare the main beam first displacement data obtained through the optical sensor 601 and the main beam second displacement data obtained through the laser displacement sensor 602 to measure the actual displacement of the main beam 200.

While certain embodiments have been described, these embodiments have been presented by way of example only, and are not intended to limit the scope of the invention. The attached claims and their equivalents are intended to cover all the modifications, substitutions and changes as would fall within the scope and spirit of the invention.

The invention claimed is:
1. A measuring device for measuring the mass of a weight, comprising:
   a main frame,
   a main beam supported on the main frame,
   a balancing system loaded on one end of the main beam,
   a weighting system loaded on the other end of the main beam,
   a weight transportation system capable of transporting and loading a standard weight or a test weight into the weighting system and capable of unloading and transporting them away from the weighting system, and
   a control system comprising an optical sensor mounted in the main frame, a laser displacement sensor mounted on the main beam, a monitor, and a control unit connected electrically to the optical sensor, the laser displacement sensor and the monitor,
   wherein the control system is adapted to compare a main beam first displacement data obtained by the optical sensor and a main beam second displacement data obtained by the laser displacement sensor to accurately measure the actual displacement of the main beam.

2. The measuring device as claimed in claim 1, wherein the main beam further comprises a link extending perpendicular to the direction of the main beam,
   one end of the link is fixed to the bottom of the main beam and the other end thereof extends into the main frame and attached to a gauge, and
   the link is fixed to the bottom of the main beam, so that the link can swing together with the main beam.

3. The measuring device as claimed in claim 2, wherein the gauge comprises a scale area,
   said scale area comprises multiple scales arranged symmetrically relative to an axis of the gauge.

4. The measuring device as claimed in claim 3, wherein the scale area has a length from 4 to 8 cm, and
   the scales have a quantity from 160 to 200.

5. The measuring device as claimed in claim 3, wherein the scale area has a length of about 4 cm,
   the scales have a quantity of about 160, and
   the distance between each adjacent scale is about 0.25 mm.

6. The measuring device as claimed in claim 2, wherein the optical sensor is arranged in such a way in the main frame that its lens is pointed right at the gauge to allow the optical sensor to read the scale movement caused by the swinging of the main beam to obtain the main beam first displacement data and to transfer the main beam first displacement data to the monitor for real-time displaying.

7. The measuring device as claimed in claim 1, wherein the laser displacement sensor is adapted to emit laser,
   the main beam comprises two reflection panels arranged equidistantly relative to the axis of the main beam for reflecting laser, and
   the laser displacement sensor is arranged on the main frame and below the corresponding reflection panel for reading the laser beam length change caused by the swinging of the main beam and transferring a signal representing the laser beam length change to the control unit to obtain the main beam second displacement data.

8. The measuring device as claimed in claim 7, wherein the distance between the center of the reflection panel and the axis of the main beam is 10% to 20% of the length of the main beam, and
   the distance between the laser displacement sensor and the reflection panel is 6 to 10 cm.

9. The measuring device as claimed in claim 7, wherein the length of the main beam is about 2 m,
   the distance between the center of the reflection panel and the axis of the main beam is about 0.3 m, and
   the distance between the laser displacement sensor and the reflection panel is about 10 cm.

10. The measuring device as claimed in claim 1, wherein the test weight has a cubic or cylindrical shape,
   the weighting system further comprises a detachable weight stand,
   the weight transportation system further comprises a detachable weight support and a detachable weight tray,
   in the condition that the test weight has a cubic shape, the weight stand and the weight support are removed, and the weight tray is mounted into the weight transportation system, so that the test weight is loaded into the weighting system by means of the weight tray, and
   in the condition that the test weight has a cylindrical shape, the weight tray is removed, and the weight stand and the weight support are mounted into the weighting system and the weight transportation system respectively, so that the test weight is loaded into the weighting system by means of the weight stand and the weight support.

* * * * *